(12) United States Patent
Choo

(10) Patent No.: US 8,856,866 B2
(45) Date of Patent: Oct. 7, 2014

(54) IMAGE FORMING APPARATUS TO RESTRICT USE OF A HARD DISC DRIVE AND A METHOD THEREOF

(75) Inventor: Young-ok Choo, Icheon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1759 days.

(21) Appl. No.: 11/252,036

(22) Filed: Oct. 18, 2005

(65) Prior Publication Data

US 2006/0082806 A1    Apr. 20, 2006

(30) Foreign Application Priority Data

Oct. 18, 2004  (KR) .................. 10-2004-0082976

(51) Int. Cl.
G06F 12/14 (2006.01)
G06F 21/60 (2013.01)
G06F 21/80 (2013.01)

(52) U.S. Cl.
CPC .............. *G06F 21/80* (2013.01); *G06F 21/608* (2013.01); *G06F 2221/2129* (2013.01)
USPC ................ 726/2; 726/21; 358/1.14; 358/1.16

(58) Field of Classification Search
CPC  G06F 21/80; G06F 21/608; G06F 2221/2129
USPC ................ 726/2, 21; 358/1.14, 1.16
See application file for complete search history.

(56) References Cited

U.S. PATENT DOCUMENTS 5,523,859 A * 6/1996 Nakajima et al. ............. 358/444
5,550,958 A * 8/1996 Hattori ......................... 358/1.16
6,014,675 A * 1/2000 Brewer et al. ................. 707/204
6,394,905 B1  5/2002 Takeda et al.
6,549,732 B2 * 4/2003 Yoshizaki et al. ............. 399/12
6,738,903 B1 * 5/2004 Haines .......................... 713/168
6,865,620 B2 * 3/2005 Homma ......................... 710/19

(Continued)

FOREIGN PATENT DOCUMENTS

EP  1372080  12/2003
JP  9-314953  12/1997

(Continued)

OTHER PUBLICATIONS

European Search Report dated Jan. 4, 2008 issued in EP 05109575.0.
Korean Office Action dated Mar. 29, 2006 issued in KR 2004-82976.

*Primary Examiner* — Yin-Chen Shaw
(74) *Attorney, Agent, or Firm* — Stanzione & Kim, LLP

(57) ABSTRACT

An image forming apparatus capable of restricting use of a hard disc drive and a method of restricting the use of the hard disc drive of the image forming apparatus. The image forming apparatus includes an interface unit to detect whether a hard disc drive is installed, and a control unit to execute an authentication procedure for the installed hard disc drive and to control whether data stored into the installed hard disc drive is printable by the image forming apparatus based on a result of the authentication procedure. Thus, even if the hard disc drive is maliciously taken, the use of the hard disc drive is not allowed if information about specifications of the hard disc drive does not match with stored information about reference specifications during the authentication procedure. Accordingly, the data stored in the hard disc drive are protected from any malicious purpose, thereby providing users with enhanced security and convenience.

20 Claims, 2 Drawing Sheets

(56) References Cited

U.S. PATENT DOCUMENTS

| | | | |
|---|---|---|---|
| 6,967,733 B1* | 11/2005 | Minowa | 358/1.15 |
| 6,986,057 B1* | 1/2006 | Cusey et al. | 713/161 |
| 7,044,574 B2* | 5/2006 | Croley et al. | 347/19 |
| 7,101,014 B2* | 9/2006 | Johnson et al. | 347/19 |
| 2004/0090647 A1* | 5/2004 | Beard et al. | 358/1.14 |
| 2005/0275891 A1* | 12/2005 | Chinwala et al. | 358/1.16 |
| 2008/0180532 A1* | 7/2008 | Ohmura | 348/207.11 |

FOREIGN PATENT DOCUMENTS

| | | |
|---|---|---|
| JP | 2004-13348 | 1/2004 |
| KR | 1999-9739 | 3/1999 |
| KR | 2000-60130 | 10/2000 |
| KR | 2003-50473 | 6/2003 |
| KR | 2003/84019 | 11/2003 |
| KR | 2004-35432 | 4/2004 |
| WO | WO 00/54125 | 9/2000 |

* cited by examiner

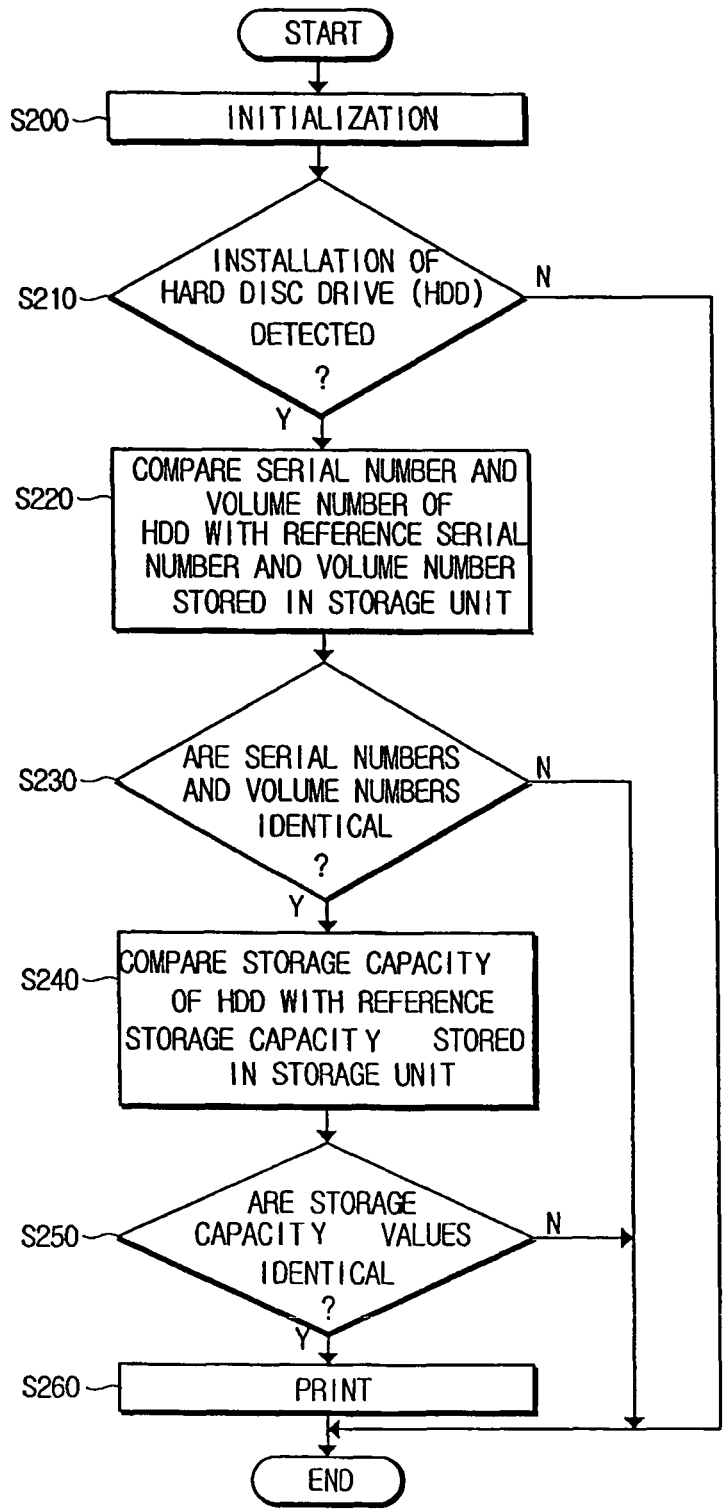

IMAGE FORMING APPARATUS TO RESTRICT USE OF A HARD DISC DRIVE AND A METHOD THEREOF

CROSS-REFERENCE TO RELATED APPLICATIONS

This application claims the benefit under 35 U.S.C. §119 (a) of Korean Patent Application No. 2004-82976, filed on Oct. 18, 2004, the entire content of which is incorporated herein by reference.

BACKGROUND OF THE INVENTION

1. Field of the Invention

The present general inventive concept relates to an image forming apparatus and a method of restricting use of a hard disc drive of the image forming apparatus. More particularly, the present general inventive concept relates to an image forming apparatus capable of printing data that is stored in an attachable/detachable hard disc drive onto a sheet of paper and a method of restricting use of the hard disc drive of the image forming apparatus.

2. Description of the Related Art

A conventional image forming apparatus is a device for printing data that is stored in a recoding medium onto a sheet of paper using a developer such as a toner. Typical examples of the conventional image forming apparatus include printers, fax machines, and multifunction peripherals (MFPs), which perform several functions, such as printing, faxing, etc., in a single device.

The recording medium from which the conventional image forming apparatus reads the printing data is a hard disc drive. The hard disc drive is a portable recording medium that is connectable to the conventional image forming apparatus. The hard disc drive has a high storage capacity and is attachable and detachable to/from the conventional image forming apparatus. The printing data is created in a host device and is transmitted from the host device to be stored in the hard disc drive.

Recently, as digital cameras and cellular phones with cameras have been widely commercialized, large amounts of image data and personal data from the digital cameras and the cellular phones that is to be printed or faxed are stored in the hard disc drive. The personal data may include sensitive information that is not supposed to be open to the public. Additionally, highly confidential data that is to be printed or faxed can also be stored in the hard disc drive.

When the hard disc drive is attached to the conventional image forming apparatus, the image data and other various data stored in the hard disc drive (i.e., the personal data or the highly confidential data) are printed out in response to a printing instruction input by a user. Therefore, when the hard disc drive is maliciously taken, the personal data and the highly confidential data related to be printed or faxed that are stored in the hard disc drive may be undesirably exposed to the public or other unintended viewers.

In particular, in the conventional image forming apparatus provided with the attachable and detachable hard disc drive, there is no problem in using the maliciously taken hard disc drive. That is, the hard disc drive can be used in another conventional image forming apparatus without difficulty. In the conventional image forming apparatus, some security measures (e.g., security numbers, ID codes, pin numbers) are taken to protect specific confidential or personal data stored in the hard disc drive. However, the confidential data or personal data that are not protected by the security measures may be accessible without difficulty by anyone.

Therefore, if the hard disc drive is stolen or lost, anyone can have access to the personal data or the confidential data stored in the hard disc drive without difficulty. Accordingly, there is a risk of exposing the confidential data or the personal data that is not protected by the security measures to the public or the other unintended viewers.

SUMMARY OF THE INVENTION

The present general inventive concept provides an image forming apparatus capable of restricting use of a hard disc drive by comparing information about specifications of the hard disc drive when the hard disc drive is attached to the image forming apparatus with information about reference specifications, and then authenticating the use of the hard disc drive when these two pieces of information match each other. The present general inventive concept also provides a method of restricting the use of the hard disc drive of the image forming apparatus.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image forming apparatus, including an interface unit to detect whether a hard disc drive is installed, and a control unit to execute an authentication procedure with respect to the installed hard disc drive and to control whether data stored in the installed hard disc drive is printable by the image forming apparatus based on a result of the authentication procedure.

The control unit may authenticate the installed hard disc drive if information about specifications of the installed hard disc drive is identical to stored information about reference specifications, and may control the data stored in the installed hard disc drive to be printed out upon authentication thereof.

The image forming apparatus may further include a display unit, which is controlled by the control unit, to display a message to indicate that authentication of the installed hard disc drive cannot be performed if the information about the specifications of the installed hard disc drive is not identical to the stored information about the reference specifications.

The control unit may control the data stored in the installed hard disc drive not to be accessible if the information about the specifications of the installed hard disc drive is not identical to the stored information about the reference specifications.

The information about the specifications of the installed hard disc drive may comprise one or more of a serial number, a volume number, and a storage capacity of the hard disc drive.

The control unit can compare the storage capacity of the installed hard disc drive with a stored reference storage capacity if the serial number and the volume number of the installed hard disc drive are identical to a stored reference serial number and a stored reference volume number, respectively.

The storage capacity of the hard disc drive may be recorded in between each use of the hard disc drive and may comprise one of an overall capacity of the hard disc drive, a used capacity of the hard disc drive, and a remaining capacity of the hard disc drive.

The foregoing and/or other aspects of the present general inventive concept may also be achieved by providing an image forming apparatus, comprising an interface to receive one or more attachable memory units having identification information and data; and an authentication unit to receive the identification information from a memory unit that is currently attached to the interface, to determine whether the currently attached memory unit is registered in the image forming apparatus according to the received identification information, and to generate a signal to the currently attached memory unit not to send the data when the currently attached memory unit is not registered in the image forming apparatus.

The foregoing and/or other aspects of the present general inventive concept may also be achieved by providing hard disc drive usable with an image forming apparatus, the hard disc drive comprising a storage unit to store identification information and data, to output the identification information to the image forming apparatus, to receive a first communication from the image forming apparatus when the hard disc drive is registered in the image forming apparatus to output the data to the image forming apparatus, and to receive no communication or a second communication from the image forming apparatus not to output the data when the hard disc drive is not registered in the image forming apparatus.

The foregoing and/or other aspects of the present general inventive concept may also be achieved by providing a method of restricting use of a hard disc drive of an image forming apparatus, the method including: detecting whether a hard disc drive is installed, performing an authentication procedure to determine whether to authenticate the hard disc drive when the hard disc drive is installed, and controlling data stored in the hard disc drive to be printable by the image forming apparatus when the hard disc drive is authenticated.

During the authentication procedure, the hard disc drive may be authenticated if information about specifications of the hard disc drive is identical to stored information about reference specifications.

The method may further include displaying a message to indicate that the hard disc drive cannot be authenticated if the information about the specifications of the hard disc drive is not identical to the stored information about the reference specifications.

If the information about the specifications of the hard disc drive is not identical to the stored information about the reference specifications, the image forming apparatus may be controlled to deny access to the data stored in the hard disc drive.

The information about the specifications of the hard disc drive may comprise one or more of a serial number, a volume number, and a storage capacity of the hard disc drive.

The authentication procedure may include comparing a serial number of the hard disc drive and a volume number of the hard disc drive with a stored reference serial number and a stored reference volume number, respectively, and comparing a storage capacity of the hard disc drive with a stored reference storage capacity if the serial number and the volume number of the hard disc drive are identical to the stored reference serial number and the stored reference volume number, respectively.

The storage capacity of the hard disc drive may be recorded in between each use of the hard disc drive and may comprise one of an overall capacity of the hard disc drive, a used capacity of the hard disc drive, and a remaining capacity of the hard disc drive.

The foregoing and/or other aspects of the present general inventive concept may also be achieved by providing a method of an image forming apparatus, the method comprising receiving one or more attachable memory units having identification information and data at an interface, receiving identification information from the one or more attachable memory units that are currently attached to the interface, authenticating the currently attached memory units by determining whether the currently attached memory units are registered in the image forming apparatus according to the received identification information, and generating a signal to the currently attached memory units not to output the data when the currently attached memory units are not registered in the image forming apparatus.

BRIEF DESCRIPTION OF THE DRAWINGS

The above aspects of the present general inventive concept will be more apparent by describing the various embodiments of the present general inventive concept with reference to the accompanying drawings, in which:

FIG. 2 is a flowchart illustrating a method of restricting use of a hard disc drive of an image forming apparatus according to an embodiment of the present general inventive concept.

DETAILED DESCRIPTION OF THE PREFERRED EMBODIMENTS

Figure 1:
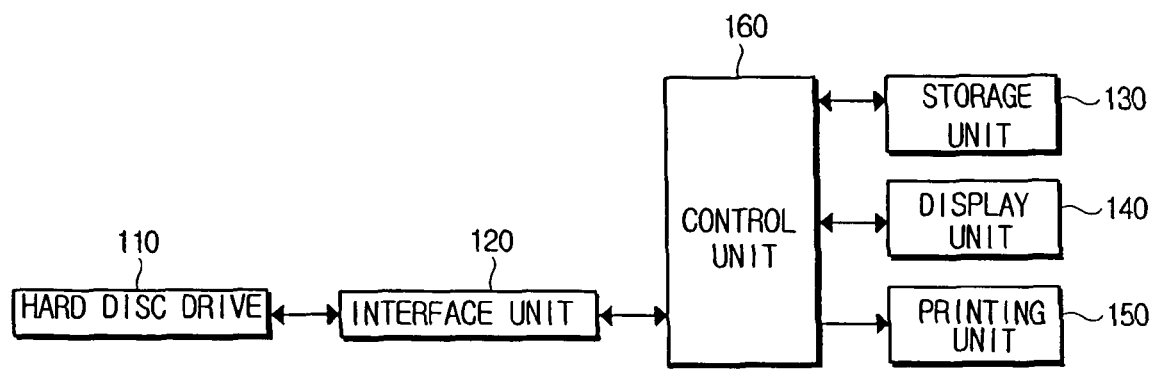
FIG. 1 is a block diagram illustrating an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating an image forming apparatus according to an embodiment of the present general inventive concept.

The image forming apparatus includes a hard disc drive 110, an interface unit 120, a storage unit 130, a display unit 140, a printing unit 150, and a control unit 160.

The hard disc drive 110 is a recording medium that can be attached to and detached from the image forming apparatus to store data.

The interface unit 120 provides an interface to exchange data between the hard disc drive 110 and the control unit 160 and detects whether the hard disc drive 110 is attached to the image forming apparatus.

The storage unit 130 is a recording medium installed within the image forming apparatus. For example, the storage unit 130 may be implemented in a flash read-only-memory (ROM). In the storage unit 130, information about specifications of the hard disc drive 110 is stored. The information about the specifications of the hard disc drive 110 may include a serial number, a volume number, a storage capacity of the hard disc drive 110, etc. The storage capacity of the hard disc drive 110 may be recorded (i.e., stored) in the storage unit 130 in between each use of the hard disc drive 110. In particular, the storage capacity of the hard disc drive 110 that is stored in the storage unit 130 includes information about an overall storage capacity of the hard disc drive 110, a used capacity of the hard disc drive 110, and a remaining capacity of the hard disc drive 110. When the hard disc drive 110 is attached to the image forming apparatus through the interface unit 120, the information (i.e., the information about the specifications) may be transmitted from the hard disc drive 110 to the image forming apparatus according to a communication (e.g., a permission communication) between the hard disc drive 110 and the image forming apparatus. When the control unit 160 determines whether the information and a reference information value match, the hard disc drive 110 may receive the permission communication from the control unit 160 and transmit data stored therein to the control unit 160 through the interface unit 120 according to the permission communication. The hard disc drive 110 may prohibit transmitting the data while transmitting the information. Additionally, the hard disc drive 110 may prohibit transmission of the data stored therein when the permission communication is not received from the control unit 160 or when the control unit transmits a prohibition communication indicating that the information does not match the reference information value.

The display unit 140 indicates whether the hard disc drive 110 is attached to the image forming apparatus when the interface unit 120 receives a connection signal from the hard disc drive 110. Additionally, the display unit 140 displays various states of the hard disc drive 110. That is, the display unit 140 displays a message indicating whether the hard disc drive 110 is a hard disc drive that is registered in the image forming apparatus. Additionally, the display unit 140 displays messages about an authentication and a status of the authentication.

The printing unit 150 prints out data stored in the hard disc drive 110 on a sheet of paper or other print medium.

When the interface unit 120 detects the installation of the hard disc drive 110, the control unit 160 controls the display unit 140 to display a message that the hard disc drive 110 is installed. Additionally, the control unit 160 proceeds with an authentication procedure to determine whether the installed hard disc drive 110 is registered in the image forming apparatus. During the authentication procedure, the control unit 160 compares the information about the specifications of the installed hard disc drive 110 with information about specifications stored in the storage unit 130.

More particularly, the control unit 160 receives the serial number and the volume number of the installed hard disc drive 110 through the interface unit 120. The control unit 160 then compares the transmitted serial number and the volume number with the serial number and the volume number stored in the storage unit 130, respectively. If either of these two serial numbers (i.e., the transmitted serial number and the stored serial number) or the two volume numbers (i.e., the transmitted volume number and the stored volume number) are not identical to each other, the control unit 160 may execute this comparison procedure up to three times. Then, the control unit 160 controls the display unit 140 to display the comparison result.

Additionally, if both the two serial numbers and the two volume numbers are identical to each other, the control unit 160 receives the storage capacity of the installed hard disc drive 110 through the interface unit 120. The control unit 160 then compares the transmitted storage capacity of the installed hard disc drive 110 with the storage capacity stored in the storage unit 130. If these two capacity values (i.e., the transmitted capacity value and the stored capacity value) do not match, the control unit 160 may execute the comparison operation up to three times. If these two capacity values match, then the control unit 160 determines that the installed hard disc drive 110 is a hard disc drive that is registered in the image forming apparatus. The control unit 160 may determine whether these two capacity values match by determining whether the transmitted capacity value is within a predetermined range of the stored capacity value. Additionally, the storage unit 130 of the image forming apparatus may include a registration table having a plurality of serial numbers, a plurality of volume numbers, and a plurality of capacity values of hard disc drives that are registered in the image forming apparatus such that more than one hard disc drive may be registered in and authenticated by the image forming apparatus.

The control unit 160 controls the display unit 140 to display a result of the authentication procedure. If the installed hard disc drive 110 is not authenticated, the control unit 160 controls the display unit 140 to display a message that indicates that the installed hard disc drive 110 cannot be authenticated. If the installed hard disc drive 110 is authenticated based on the determination that the installed hard disc drive 110 is one of the hard disc drives that is registered in the image forming apparatus, the control unit 160 retrieves data stored in the hard disc drive 110 and controls the printing unit 150 to print the retrieved data onto a sheet of paper or other printing medium. However, if the installed hard disc drive 110 is not authenticated based on the determination that the installed hard disc drive 110 is not one of the hard disc drives that is registered, access to the hard disc drive 110 is denied. Therefore, it is possible to prevent the control unit 160 from retrieving and printing out the data stored into the hard disc drive 110.

FIG. 2 is a flowchart illustrating a method of restricting use of a hard disc drive of an image forming apparatus according to an embodiment of the present general inventive concept. The method of FIG. 2 may be performed by the image forming apparatus of FIG. 1.

With reference to FIGS. 2 and 3, when power is turned on, the control unit 160 initiates the image forming apparatus at operation S200. The control unit 160 resets an initial operation environment of the image forming apparatus.

Once the initialization is completed, the control unit 160 controls the interface unit 120 to detect whether the hard disc drive 110 is installed at operation S210. If the hard disc drive 110 is connected with the interface unit 120, the control unit 160 receives a connection signal through the interface unit 120.

At operation S220, if the interface unit 120 determines that the hard disc drive 110 is installed, the control unit 160 compares a serial number and a volume number of the installed hard disc drive 110 with a serial number and a volume number stored in the storage unit 130. The control unit 160 may compare the serial number and the volume number of the installed hard disc drive 110 with a plurality of serial numbers and volume numbers stored in the storage unit 130 when more than one hard disc drive is registered in the image forming apparatus. The serial number and the volume number of the installed hard disc drive 110 are transmitted from the hard disc drive 110 through the interface unit 120. The serial number and the volume number stored in the storage unit 130 may be information input from a user.

At operation S230, the control unit 160 determines whether the serial number and the volume number of the installed hard disc drive 110 are identical to (i.e., match) the serial number and volume number in the storage unit 130.

If the serial number and the volume number of the installed hard disc drive 110 are identical to the stored serial number and volume number, at operation S240, the control unit 160 compares the storage capacity of the installed hard disc drive 110 and a storage capacity of the hard disc drive 110 that is previously stored in the storage unit 130. The storage capacity of the installed hard disc drive 110 is transmitted from the hard disc drive 110 through the interface unit 120. The compared storage capacity of the hard disc drive 110 can be one of an overall capacity of the hard disc drive 110, a used capacity of the hard disc drive 110, and a remaining capacity of the hard disc drive 110.

At operation S250, the control unit 160 determines whether the storage capacity of the installed hard disc drive 110 is identical to the storage capacity of the hard disc drive 110 stored in the storage unit 130. If these two storage capacity values are the same, the control unit 160 determines that the installed hard disc drive 110 is one of the hard disc drives registered in the image forming apparatus. The control unit 160 then controls the hard disc drive 110 to print out data stored in the hard disc drive 110 on a sheet of paper or other printing medium at operation S260. In some cases the control unit 160 may determine whether the storage capacity of the installed hard disc drive 110 matches the storage capacity stored in the storage unit 130 by determining whether the storage capacity of the hard disc drive 110 is within a range of the storage capacity stored in the storage unit 130.

The present general inventive concept may be embodied in a computer by running a program from a computer-readable medium, including but not limited to storage media such as magnetic storage media (ROMs, RAMs, floppy disks, magnetic tapes, etc.), and optically readable media (CD-ROMs, DVDs, etc.). The present general inventive concept may be embodied as a computer-readable medium having a computer-readable program code to cause a number of computer systems connected via a network to effect distributed processing.

Although the embodiments of the present general inventive concept describe that the image forming apparatus restricts the use of the hard disc drive by requiring authentication of the hard disc drive before data stored in the hard disc drive is made accessible, the hard disc drive may also restrict access of the data stored therein by requiring a permission communication to be received from the image forming apparatus. For example, the image forming apparatus according to the embodiments of the present general inventive concept may transmit a permission communication to the hard disc drive when the image forming apparatus performs a registration check and determines that the hard disc drive is registered therein. Thus, when the hard disc drive is installed in a different conventional image forming apparatus that does not include a registration check (i.e., the authentication procedure), the conventional image forming apparatus may be incapable of sending the permission communication to the hard disc drive. As a result, the hard disc drive according the present embodiment restricts access to the data stored therein. This prevents the hard disc drive from being taken and used in the conventional image forming apparatus that does not include the authentication procedure.

According to various embodiments of the present general inventive concept, even if a hard disc is taken or lost, it is impossible to use the hard disc drive if information about specifications of an installed hard disc drive and stored information about reference specifications of the hard disc drive do not match each other. Thus, restricted use of the hard disc drive further provides users with enhanced convenience and security by safely protecting data including confidential personal data stored in the hard disc drive.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus in which a hard disc drive is able to be installed, comprising:
a storage device to store information about reference specifications and storage capacity corresponding to a hard disc drive to be installed;
an interface device to detect whether a hard disc drive having specification information and data is installed in the image forming apparatus; and
a control circuit, when the hard disc drive is installed in the image forming apparatus, to authenticate the installed hard disc drive by comparing the specification information of the installed hard disc drive to the stored information about reference specifications, the control circuit to authenticate the hard disc drive when the specification information matches the stored information and refusing authentication of the installed hard disc drive when there is not a match, the control circuit to transmit a permission communication to the installed hard disc drive to enable the data stored in the installed hard disc drive to be accessed by the image forming apparatus, and the control circuit to access the data stored in the installed hard disc drive based on a result of the authentication,
wherein the information about the reference specifications comprises one or more of a serial number and a volume number of the hard disc drive,
wherein, when it is determined that the serial number and the volume number of the installed hard disc drive are identical to a serial number and a volume number stored in the storage device, respectively, the control circuit to authenticate the installed hard disc drive by comparing storage capacity of the installed hard disc drive with the storage capacity stored in the storage device.

2. The image forming apparatus of claim 1, wherein the control circuit authenticates the installed hard disc drive when the storage capacity of the installed hard disc drive is identical to the storage capacity stored in the storage device, and controls the data stored in the installed hard disc drive to be printed out upon authentication thereof.

3. The image forming apparatus of claim 2, further comprising:
a display device, which is controlled by the control circuit, to display a message to indicate that authentication of the installed hard disc drive cannot be performed when the specification information of the installed hard disc drive is not identical to the stored information about the reference specifications.

4. The image forming apparatus of claim 3, wherein the control circuit controls the data stored in the installed hard disc drive not to be accessible when the specification information of the installed hard disc drive does not match the stored information about the reference specifications.

5. The image forming apparatus of claim 1, wherein the storage capacity of the hard disc drive is recorded in between each use of the hard disc drive, and the storage capacity comprises one of an overall capacity of the hard disc drive, a used capacity of the hard disc drive, and a remaining capacity of the hard disc drive.

6. An image forming apparatus in which one or more memory devices are able to be installed, comprising:
a printing device;
a storage device to store identification information for one or more memory devices that are registered with the image forming apparatus;
an interface device to receive one or more attachable memory devices having identification information and data; and
an authentication device to receive the identification information from a memory device that is currently attached to the interface device, to authenticate the currently attached memory device by determining whether the currently attached memory device is registered in the image forming apparatus according to the received identification information, a control circuit to access the data stored in the currently attached memory device when the currently attached memory device is registered and to control the printing device to print the accessed data stored in the currently attached memory device, wherein the authentication device receives a first identification information and a second identification information from the currently attached memory device, wherein the authentication device determines whether the received first identification information matches any of the stored identification information, wherein the authentication device further determines whether the received second identification information matches any of the stored identification information, wherein the received first identification information comprises a specification which includes one or more of a serial number and a volume number of the currently attached memory device and the received second identification information comprises a storage capacity of the currently attached memory device, and wherein the authentication device authenticates the currently attached memory device when the received second identification information matches any of the stored identification information and transmits a permission communication to the currently attached memory device to enable the data stored in the currently attached memory device to be accessed by the image forming apparatus, and otherwise refuses authentication of the currently attached memory devices.

7. The image forming apparatus of claim 6, wherein the authentication device does not authenticate the currently attached memory device when the received first identification information does not match any of the stored identification information.

8. The image forming apparatus of claim 6, wherein the signal generated by the authentication device comprises a permission communication transmitted to the currently attached memory device to enable the data stored in the currently attached memory device to be accessed by the image forming apparatus.

9. The image forming apparatus of claim 6, wherein the identification information comprises a storage capacity of the currently attached memory device, and the image forming apparatus further comprises:

a storage device to record the storage capacity of the currently attached memory device each time the currently attached memory device is removed from the interface device such that the authentication device compares a previous storage capacity with a current storage capacity to determine whether the currently attached memory device is registered.

10. The image forming apparatus of claim 6, further comprising:

a display device to display a first indication to indicate when the currently attached memory device is attached to the interface device and to display a second indication to indicate a status of the authentication of the currently attached memory device.

11. The image forming apparatus of claim 6, wherein the currently attached memory device restricts access to the data stored therein until the permission communication is received from the authentication device to indicate that the currently attached memory device is registered in the image forming apparatus.

12. A method of controlling an image forming apparatus in which a hard disc drive is able to be installed, the method comprising:

storing information about reference specifications and storage capacity corresponding to a hard disc drive to be installed;

detecting whether a hard disc drive having specification information and data is installed in the image forming apparatus;

authenticating the installed hard disc drive by comparing, when the hard disc drive is installed in the image forming apparatus, the specification information of the installed hard disc drive to the stored information about reference specifications, the authentication comprising:

authenticating the installed hard disc drive when the specification information matches the stored information and refusing authentication of the installed hard disc drive when there is not a match; and transmitting a permission communication to the installed hard disc drive to enable the data stored in the installed hard disc drive to be accessed by the image forming apparatus; and accessing the data stored in the installed hard disc drive based on the results of the authentication procedure, wherein the information about the reference specifications comprises one or more of a serial number and a volume number of the hard disc drive, wherein, when it is determined that the serial number and the volume number of the installed hard disc drive are identical to a serial number and a volume number stored, respectively, the authenticating the installed hard disc drive by comparing storage capacity of the installed hard disc drive with the stored storage capacity.

13. The method of claim 12, wherein the controlling comprises, when the information about the specifications of the hard disc drive matches the stored information about the reference specifications and the storage capacity of the installed hard disc drive is identical to the stored storage capacity, authenticating the hard disc drive and controlling the image forming apparatus to print the data stored in the hard disc drive.

14. The method of claim 13, further comprising:

displaying a message that the hard disc drive cannot be authenticated when the specification information of the hard disc drive is not identical to the stored information about the reference specifications.

15. The method of claim 13, wherein the controlling comprises, when the specification information of the hard disc drive does not match the stored information about the reference specifications, controlling the image forming apparatus is controlled to deny access to the data stored in the hard disc drive.

16. The method of claim 13, wherein the storage capacity of the hard disc drive is recorded in between each use of the hard disc drive and comprises one of an overall capacity of the hard disc drive, a used capacity of the hard disc drive, and a remaining capacity of the hard disc drive.

17. A method of controlling an image forming apparatus, the method comprising:

storing identification information for the one or more attachable memory devices that are registered with the image forming apparatus;

receiving one or more attachable memory device having identification information and data at an interface device;

receiving identification information from the one or more attachable memory devices that are currently attached to the interface device;

authenticating the one or more currently attached memory devices by determining whether the one or more currently attached memory devices are registered in the image forming apparatus according to the received identification information; and accessing the data stored in the currently attached memory devices when the currently attached memory devices is registered;

printing the accessed data stored in the currently attached memory devices, wherein the authenticating of the currently attached memory devices comprises:

receiving a first identification information and a second identification information from the currently attached memory devices;

determining whether the received first identification information which includes one or more of a serial number and a volume number of the currently attached memory device matches any of the stored identification information; and determining whether the received second identification information matches any of the stored identification information, authenticating the currently attached memory devices when the received second identification information matches any of the stored identification information and transmitting a permission communication to the currently attached memory devices to enable the data stored in the currently attached memory devices to be accessed by the image forming apparatus, and otherwise refuses authentication of the currently attached memory devices, wherein the received first identification information comprises a specification of the currently attached memory devices and the received second identification information comprises a storage capacity of the currently attached memory devices.

18. The method of claim 17, wherein the received identification information comprises a storage capacity of the currently attached memory devices, and the method further comprises:

recording the storage capacity of the currently attached memory devices each time the currently attached memory devices are removed from the interface device such that the authenticating of the currently attached memory devices comprises comparing a previous storage capacity with a current storage capacity to determine whether the currently attached memory devices are registered.

19. The method of claim 17, further comprising:

displaying a first indication to indicate that the currently attached memory devices are attached to the interface device and displaying a second indication to indicate a status of the authentication of the currently attached memory devices.

20. The method of claim 17, wherein the currently attached memory devices restrict access to the data stored therein until a permission communication is received from the image forming apparatus to indicate that the currently attached memory devices are registered in the image forming apparatus.

* * * * *